United States Patent
Chen et al.

(10) Patent No.: US 10,602,239 B2
(45) Date of Patent: Mar. 24, 2020

(54) METHOD AND APPARATUS FOR TRACK COMPOSITION

(71) Applicant: MEDIATEK INC., Hsinchu (TW)

(72) Inventors: Lulin Chen, San Jose, CA (US); Xin Wang, San Jose, CA (US); Shuai Zhao, San Jose, CA (US); Wang Lin Lai, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 26 days.

(21) Appl. No.: 15/928,823

(22) Filed: Mar. 22, 2018

(65) Prior Publication Data

US 2018/0279014 A1     Sep. 27, 2018

Related U.S. Application Data

(60) Provisional application No. 62/570,697, filed on Oct. 11, 2017, provisional application No. 62/531,378, (Continued)

(51) Int. Cl.
*H04N 21/854* (2011.01)
*G06F 16/78* (2019.01)
(Continued)

(52) U.S. Cl.
CPC ........... *H04N 21/854* (2013.01); *G06F 16/78* (2019.01); *G11B 27/031* (2013.01); *H04N 5/262* (2013.01); *H04N 5/265* (2013.01); *H04N 5/2624* (2013.01); *H04N 5/272* (2013.01); *H04N 21/431* (2013.01); *H04N 21/85406* (2013.01)

(58) Field of Classification Search
CPC .... H04N 21/854; H04N 5/2962; G06F 16/78; G11B 27/031
See application file for complete search history.

(56) References Cited

U.S. PATENT DOCUMENTS 6,466,226 B1 * 10/2002 Watson ................. G06T 15/005
345/609
2010/0158099 A1 * 6/2010 Kalva ............... H04N 21/23412
375/240.01

(Continued)

OTHER PUBLICATIONS

Combined Taiwanese Office Action and Search Report dated Feb. 27, 2019 in Patent Application No. 107110032 (with English translation of categories of cited documents), 4 pages.

*Primary Examiner* — Sumaiya A Chowdhury
(74) *Attorney, Agent, or Firm* — Oblon, McClelland, Maier & Neustadt, L.L.P.

(57) ABSTRACT

Aspects of the disclosure provide an apparatus that includes interface circuitry and processing circuitry. The interface circuitry is configured to receive signals carrying metadata for visual track composition from multiple visual tracks. The visual track composition includes alpha compositing, and can include spatial compositing and background compositing. The processing circuitry is configured to parse the metadata to extract configuration information for the visual track composition. Further, the processing circuitry receives a first sample from a first visual track and a second sample from a second visual track, and combines the first sample with the second sample to generate a composite sample based on the configuration information for the visual track composition.

20 Claims, 10 Drawing Sheets

Related U.S. Application Data filed on Jul. 12, 2017, provisional application No. 62/518,637, filed on Jun. 13, 2017, provisional application No. 62/475,244, filed on Mar. 23, 2017.

(51) Int. Cl.

| | | |
|---|---|---|
| *H04N 5/265* | (2006.01) | |
| *H04N 5/262* | (2006.01) | |
| *H04N 5/272* | (2006.01) | |
| *G11B 27/031* | (2006.01) | |
| *H04N 21/431* | (2011.01) | |

(56) References Cited

U.S. PATENT DOCUMENTS

| | | | |
|---|---|---|---|
| 2012/0268552 A1* | 10/2012 | Choi | H04N 7/147 348/14.07 |
| 2015/0156469 A1* | 6/2015 | Qu | H04N 9/8715 348/43 |
| 2016/0080833 A1* | 3/2016 | Denoual | H04N 21/234327 725/116 |
| 2016/0189412 A1* | 6/2016 | Saitou | G06T 13/80 345/625 |
| 2016/0267879 A1* | 9/2016 | Champel | H04N 5/44591 |

* cited by examiner

```
aligned(8) class SubPictureCompositionBox extends
TrackGroupTypeBox('spco') {
    unsigned int(16) composition_width;
    unsigned int(16) composition_height;
    unsigned int(1)  matrix_flag=0;
    unsigned int(1)  blending_Flag=0;
    unsigned int(2)  background_flag=0;
    unsigned int(4)  reserved = 0
}
```

```
aligned(8) class SubPictureCompositionBox extends TrackGroupTypeBox('spco') {
    unsigned int(16) composition_width;
    unsigned int(16) composition_height;
    unsigned int(1) matrix_flag=1;
    unsigned int(1) blending_flag=0;
    unsigned int(2) background_flag=0;
    unsigned int(4) reserved = 0
    template int(32)[9]    matrix=
    { 0x00010000,0,0,0,0x00010000,0,0,0,0x40000000 };
        // unity matrix
    unsigned int(32) width;
    unsigned int(32) height;
    template int(16) layer;
}
```

```
aligned(8) class SubPictureCompositionBox extends TrackGroupTypeBox('spco') {
    unsigned int(16) composition_width;
    unsigned int(16) composition_height;
    unsigned int(1) matrix_flag=1;
    unsigned int(1) blending_flag=1;
    unsigned int(2) background_flag=0;
    unsigned int(4) reserved = 0
    template int(32)[9]    matrix=
    { 0x00010000,0,0,0,0x00010000,0,0,0,0x40000000 };
        // unity matrix
    unsigned int(32) width;
    unsigned int(32) height;
    template int(16) layer;
    unsigned int(8) alpha_blending_mode;
    unsigned int(8) blending_mode_specific_params[]
}
```

```
aligned(8) class SubPictureCompositionBox extends TrackGroupTypeBox('spco') {
    unsigned int(16) composition_width;
    unsigned int(16) composition_height;
    unsigned int(1) matrix_flag=1;
    unsigned int(1) blending_flag=1;
    unsigned int(2) background_flag=2;
    unsigned int(4) reserved = 0
    template int(32)[9]    matrix=
    { 0x00010000,0,0,0,0x00010000,0,0,0,0x40000000 };
        // unity matrix
    unsigned int(32) width;
    unsigned int(32) height;
    template int(16) layer;
    unsigned int(8) alpha_blending_mode;
    unsigned int(8) blending_mode_specific_params[];
    unsigned int(16) image_item_ID
}
```

```
aligned(8) class SubPictureCompositionBox extends TrackGroupTypeBox('spco'){
    unsigned int(16) composition_width;
    unsigned int(16) composition_height;
    unsigned int(1) matrix_flag;
    unsigned int(1) blending_flag;
    unsigned int(2) background_flag;
    unsigned int(4) reserved = 0
    if(matrix_flag == 1){
        template int(32)[9]    matrix=
        { 0x00010000,0,0,0,0x00010000,0,0,0,0x40000000 };
        unsigned int(32) width;
        unsigned int(32) height;
        template int(16) layer;
    }
    if(blending_flag ==1){
        unsigned int(8) alpha_blending_mode;
        unsigned int(8) blending_mode_specific_params[];
    }
    if ((background_flag & 1) == 1) // background color
        for (j=0; j<4; j++)
            unsigned int(16) canvas_fill_value;
    if ((background_flag & 2) == 2) // background image
        unsigned int(16) image_item_ID;
    if ((background_flag & 3) == 1) // background video
        unsigned int(16) video_track_ID;
}
```

800

METHOD AND APPARATUS FOR TRACK COMPOSITION

INCORPORATION BY REFERENCE

This present disclosure claims the benefit of U.S. Provisional Application No. 62/475,244, "Method and apparatus of carriage and delivery of alpha compositing metadata in MPEG file format for media applications" filed on Mar. 23, 2017, U.S. Provisional Application No. 62/518,637, "Method and apparatus of matrix and sub-picture track composition for OMAF" filed on Jun. 13, 2017, U.S. Provisional Application No. 62/531,378, "Method of Sub-Picture Track Composition Processing" filed on Jul. 12, 2017, and U.S. Provisional Application No. 62/570,697, "Method of using the matrix syntax element for sub-picture composition" filed on Oct. 11, 2017. The entire disclosures of the prior applications are hereby incorporated by reference in their entirety.

TECHNICAL FIELD

The present disclosure describes embodiments generally related to video coding method and apparatus, and more particularly related to multi-track visual data processing technology.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Media content can be stored and delivered using multiple media tracks in terms of a file format. In an example, a large frame region can be divided into sub-picture regions, and video for the large frame region can be stored as a plurality of visual tracks respectively for the sub-picture regions. The plurality of visual tracks can be delivered and combined to render the video for the large frame region.

SUMMARY

Aspects of the disclosure provide an apparatus that includes interface circuitry and processing circuitry. The interface circuitry is configured to receive signals carrying metadata for visual track composition from multiple visual tracks. The visual track composition includes alpha compositing, and can include spatial compositing and background compositing. The processing circuitry is configured to parse the metadata to extract configuration information for the visual track composition. Further, the processing circuitry receives a first sample from a first visual track and a second sample from a second visual track, and combines the first sample with the second sample to generate a composite sample based on the configuration information for the visual track composition.

In an embodiment, the processing circuitry is configured to parse the metadata in a transform property box to extract the configuration information for the visual track composition. In another embodiment, the processing circuitry is configured to parse the metadata in a sub-picture composition box to extract the configuration information for the visual track composition.

According to an aspect of the disclosure, the processing circuitry is configured to parse the metadata to extract a first flag indicating spatial compositing, a second flag indicating the alpha compositing, and a third flag indicating background compositing. In an embodiment, the processing circuitry is configured to parse the metadata to extract an alpha compositing mode and parameters associated with the alpha compositing mode when the second flag is indicative of using the alpha compositing in the visual track composition. Further, in an example, the processing circuitry is configured to parse the metadata to extract a matrix for the spatial compositing when the first flag is indicative of using the spatial compositing in the visual track composition. The matrix can be provided in at least one of a movie header box, a track header box and a sub-picture composition box. In another example, the processing circuitry is configured to parse the metadata to extract parameters for the background compositing when the third flag is indicative of using the background compositing in the visual track composition.

Aspects of the disclosure provide another apparatus. The apparatus includes processing circuitry and memory circuitry. The processing circuitry is configured to form multiple visual tracks of visual data for different visual view, and determine metadata for visual track composition from the multiple visual tracks. The visual track composition includes alpha compositing, and can include background compositing and spatial compositing. Further, the processing circuitry encapsulates the metadata with the multiple visual tracks in a file, and stores the file in the memory circuitry.

In an embodiment, the processing circuitry is configured to encapsulate the metadata in a transform property box in the file. In another embodiment, the processing circuitry is configured to encapsulate the metadata in a sub-picture composition box in the file.

According to an aspect of the disclosure, the processing circuitry is configured to include, in the metadata, a first flag indicating spatial compositing, a second flag indicating the alpha compositing, and a third flag indicating background compositing.

In an embodiment, the processing circuitry is configured to include an alpha compositing mode and parameters associated with the alpha compositing mode in the metadata when the second flag is indicative of using the alpha compositing in the visual track composition.

In another embodiment, the processing circuitry is configured to include a matrix for the spatial compositing in the metadata when the first flag is indicative of using the spatial compositing in the visual track composition. The matrix can be included in at least one of a movie header box, a track header box and a sub-picture composition box. Further, in an example, the processing circuitry is configured to include parameters for the background compositing in the metadata when the third flag is indicative of using the background compositing in the visual track composition.

Aspects of the disclosure provide a method for image processing. The method includes receiving, by interface circuitry of an apparatus, signals carrying metadata for visual track composition from multiple visual tracks. The visual track composition includes alpha compositing, and can include spatial compositing and background compositing. Further, the method includes parsing, by processing circuitry of the apparatus, the metadata to extract configuration information for the visual track composition. Then the method includes receiving, a first sample from a first visual track and a second sample from a second visual track, and combining the first sample with the second sample to generate a composite sample based on the configuration information for the visual track composition.

BRIEF DESCRIPTION OF THE DRAWINGS

Various embodiments of this disclosure that are proposed as examples will be described in detail with reference to the following figures, wherein like numerals reference like elements, and wherein:

FIGS. 4-8 show examples of sub-picture composition boxes according to embodiments of the disclosure;

DETAILED DESCRIPTION OF EMBODIMENTS

Visual content, such as an ordinary video and omnidirectional video/360 video content, can be represented as a plurality of media streams over time. The media streams are referred to as tracks, when the media streams are represented or captured in a file format such as ISO base media file format (ISOBMFF). In some embodiments, a visual track includes a sequence of image samples in a temporal order, and the visual track has a spatial attribute, such as a visual view (e.g., a viewing scope of visual data in the visual track), associated with the visual track. For example, a main visual track includes a sequence of image samples (e.g., panorama scene) of a relatively large visual view, and a region visual track includes a sequence of image samples of a region (e.g., a tile scene, a partition, a sub-picture) in the large visual view. A media file can include multiple visual tracks with respective spatial attributes.

Various media applications and use cases combine images (or videos) from different visual tracks to generate a composite image (a composite video). The composition of multiple images (or videos) from different visual tracks can include various image (or video) operations, such as spatial transformation, background blending, alpha compositing and the like. The spatial transformation refers to spatial placement, rotation and scaling of images (or videos). The background blending refers to the process to fill in areas that are not covered by region visual tracks with a background image (a background video). The alpha compositing refers to combine images (or videos) to create an appearance of partial or full transparency. Aspects of the disclosure provide techniques to encapsulate configuration information for visual track composition, such as the spatial transformation information, the background blending information, and the alpha compositing information in a media file. Further, the disclosure provides techniques to combine images (or videos) from different visual tracks based on the configuration information for visual track composition in the media file.

Figure 1:
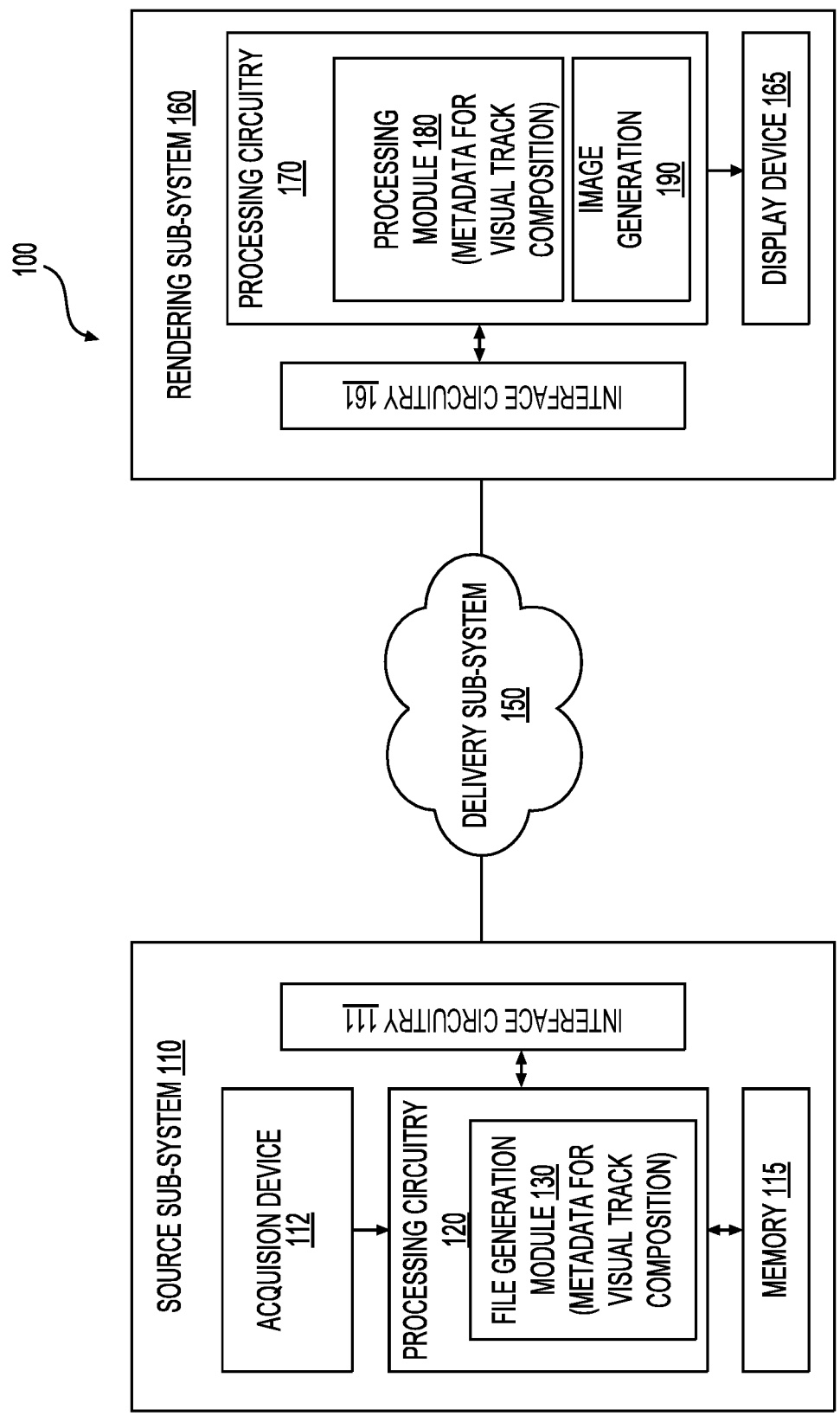
FIG. 1 shows a block diagram of a media system 100 according to an embodiment of the disclosure.

FIG. 1 shows a block diagram of a media system 100 according to an embodiment of the disclosure. The media system 100 includes a source sub-system 110, a delivery sub-system 150 and a rendering sub-system 160 coupled together. The source sub-system 110 is configured to acquire media data (e.g., virtual reality video) and suitably encapsulate the media data into one or more files. The delivery sub-system 150 is configured to deliver the encapsulated media data from the source sub-system 110 to the rendering sub-system 160. The rendering sub-system 160 is configured to render video according to the media data.

According to an aspect of the disclosure, the source sub-system 110 structures media data into tracks, and each track is formed based on a sequence of samples in a temporal order. In an embodiment, the source sub-system 110 structures visual data (e.g., image data, video data) into visual tracks according to specific attributes, such as spatial partitions, image qualities, encryption modes, content categories and the like. Further, the source sub-system 110 constructs metadata that provides information for the visual data and/or visual tracks. For example, the source sub-system 110 constructs metadata that provides information for visual track composition from multiple visual tracks. In some embodiments, the source sub-system 110 can construct a metadata track with metadata samples in a temporal order. A metadata sample at a time provides the information for visual track composition at the time.

In some embodiments, the source sub-system 110 constructs metadata for visual track composition within a single ISOBMFF file that includes multiple visual tracks. In an embodiment, the multiple visual tracks can include elementary visual tracks that are formed based on a sequence of samples in temporal order, and can include derived visual tracks that are constructed based on the elementary visual tracks. The derived visual tracks can be virtual tracks with variable parameters. The samples of the derived visual tracks do not exist in the ISOBMFF file, and can be determined (calculated) after the variable parameters are determined. In some examples, a derived visual track is a composite of multiple visual tracks. The derived visual track can be defined by a transform property that carries metadata for visual track composition. For example, the transform property specifies information of compositing position (e.g., coordinates of a specific point, such as the top-left corner of a rectangular region for compositing), compositing size (e.g., width and height of a rectangular region for compositing), an alpha blending mode (also referred to as alpha compositing mode in some examples), and blending specific parameters associated with the alpha blending mode.

In an example, the source sub-system 100 can construct a primary visual track and a secondary visual track. The primary visual track includes first image samples of a primary view, and the secondary visual track includes second image samples of a secondary view (e.g., an advertisement view, a caption view). Further, the source sub-system 100 constructs a derived visual track based on a transform property. The transform property specifies a rectangular region in the primary view for alpha-compositing the second image samples of the secondary view with the first image samples of the primary view to generate a composite view. In an example, the first image samples form a background for the composite view. In the rectangular region, the second image samples are alpha-blended with the first image samples according to an alpha-blending mode, and parameters (e.g., transparency level in the rectangular region) associated with the alpha-blending mode.

In another embodiment, the multiple visual tracks can be sub-picture visual tracks for regions (sub-pictures, tiles, partitions) of a larger view, and the source sub-system 100 can construct a track group (e.g., object) as a composite of multiple sub-picture visual tracks. The track group can carry metadata for visual track composition. In an example, image frames are captured for a relatively large view. The relatively large view can be partitioned into multiple region views, and the image frames of the relatively large view are partitioned into sub-pictures for multiple region views. The source sub-system 110 then constructs sub-picture visual tracks, and each sub-picture visual track includes sub-pictures for a region view in a temporal order. Further, the source sub-system 100 constructs a track group that includes two or more sub-picture visual tracks, and specifies a composition of the two or more sub picture visual tracks. The track group includes metadata for visual track composition, such as the spatial transformation, the background compositing, and the alpha compositing. In an example, two region views can overlap, and the metadata for visual track composition is used to provide information to generate visual view for the overlapping region.

It is noted that the metadata for visual track composition can be included in various forms. In an example, spatial transformation can be specified using a matrix. In some embodiment, the track group specifies a matrix that defines spatial transformation, such as translational, rotation, and scaling etc. For example, the matrix is a 3×3 matrix as shown in by Exp. 1

$$\text{matrix} = \begin{bmatrix} a & b & u \\ c & d & v \\ x & y & w \end{bmatrix} \quad \text{Exp. 1}$$

where a, b, c, c, x, y, u, v, and w are real values. In an example, a point (p, q) (p and q are coordinates in a two-dimension plane) is transformed into a point (p', q') (p' and q' are coordinates in a two-dimension plane) based on the 3×3 matrix according to Exp. 2-5:

$$m = ap + cq + x; \quad \text{Exp. 2}$$

$$n = bp + dq + y; \quad \text{Exp. 3}$$

$$z = up + vq + w; \quad \text{Exp. 4}$$

$$p' = m/z; \quad \text{Exp. 5}$$

$$q' = n/z \quad \text{Exp. 6}$$

It is noted that the matrix can be provided at various levels, such as movie level (e.g., in a movie header), track level (e.g., in a track header), and track group level (in a track group or a sub-picture composition).

In another example, the alpha compositing can be specified by an alpha blending mode and parameters associated with the alpha blending mode. Appendix A shows a table of exemplary alpha blending modes.

In the FIG. 1 example, the source sub-system 110 includes an acquisition device 112, a processing circuitry 120, a memory 115, and an interface circuitry 111 coupled together.

The acquisition device 112 is configured to acquire various media data. In an example, the acquisition device 112 is configured to acquire images, sound, and the like of the ordinary video and/or omnidirectional video/360 video. The acquisition device 112 can have any suitable settings. In an example, the acquisition device 112 includes a camera rig (not shown) with multiple cameras, such as an imaging system with two fisheye cameras, a tetrahedral imaging system with four cameras, a cubic imaging system with six cameras, an octahedral imaging system with eight cameras, an icosahedral imaging system with twenty cameras, and the like, configured to take images of various directions in a surrounding space.

In an embodiment, the images taken by the cameras are overlapping, and can be stitched to provide a larger coverage of the surrounding space than a single camera. In an example, the images taken by the cameras can provide 360° sphere coverage of the whole surrounding space. It is noted that the images taken by the cameras can provide less than 360° sphere coverage of the surrounding space.

The media data acquired by the acquisition device 112 can be suitably stored or buffered, for example in the memory 115. The processing circuitry 120 can access the memory 115, process the media data, and encapsulate the media data in suitable format. The encapsulated media data is then suitably stored or buffered, for example in the memory 115.

In an embodiment, the processing circuitry 120 includes an audio processing path configured to process audio data, and includes an image/video processing path configured to process image/video data. The processing circuitry 120 then encapsulates the audio, image and video data with metadata according to a suitable format.

In an example, the images acquired by the acquisition device 112 are two-dimension (2D) images. In another example, on the image/video processing path, the processing circuitry 120 can stitch images taken from different cameras together to form a stitched image, such as an omnidirectional image, and the like. Then, the processing circuitry 120 can project the omnidirectional image according to suitable 2D plane to convert the omnidirectional image to 2D images that can be encoded using 2D encoding techniques. Then the processing circuitry 120 can suitably encode the image and/or a stream of images.

It is noted that the processing circuitry 120 can project the omnidirectional image according to any suitable projection technique. In an example, the processing circuitry 120 can project the omnidirectional image using equirectangular projection (ERP). The ERP projection projects a sphere surface, such as omnidirectional image, to a rectangular plane, such as a 2D image, in a similar manner as projecting earth surface to a map. In an example, the sphere surface (e.g., earth surface) uses spherical coordinate system of yaw (e.g., longitude) and pitch (e.g., latitude), and the rectangular plane uses XY coordinate system. During the projection, the yaw circles are transformed to the vertical lines and the pitch circles are transformed to the horizontal lines, the yaw circles and the pitch circles are orthogonal in the spherical coordinate system, and the vertical lines and the horizontal lines are orthogonal in the XY coordinate system.

In another example, the processing circuitry 120 can project the omnidirectional image to faces of platonic solid, such as tetrahedron, cube, octahedron, icosahedron, and the like. The projected faces can be respectively rearranged, such as rotated, relocated to form a 2D image. The 2D images are then encoded.

It is noted that, in an embodiment, the processing circuitry 120 can encode images taken from the different cameras, and does not perform the stitch operation and/or the projection operation on the images.

According to an aspect of the disclosure, the processing circuitry 120 is configured to encapsulate the visual content into multiple visual tracks, and construct metadata for visual track composition.

According to an aspect of the disclosure, the processing circuitry 120 includes a file generation module 130 configured to encapsulate visual tracks and metadata in files. In an embodiment, the processing circuitry 120 is configured to use an extensible format standard, such as ISO base media file format (ISOBMFF) and the like for time-based media, such as video and/or audio. In an example, the ISO base media file format defines a general structure for time-based multimedia files, and is flexible and extensible that facilitates interchange, management, editing and presentation of media. The ISO base media file format is independent of particular network protocol, and can support various network protocols in general. Thus, in an example, presentations based on files in the ISO base media file format can be rendered locally, via network or via other stream delivery mechanism.

Generally, a media presentation can be contained in one or more files. One specific file of the one or more files includes metadata for the media presentation, and is formatted according to a file format, such as the ISO base media file format. The specific file can also include media data. When the media presentation is contained in multiple files, the other files can include media data. In an embodiment, the metadata is used to describe the media data by reference to the media data. Thus, in an example, the media data is stored in a state agnostic to any protocol. The same media data can be used for local presentation, multiple protocols, and the like. The media data can be stored with or without order.

The ISO base media file format includes a specific collection of boxes. The boxes are the logical containers. Boxes include descriptors that hold parameters derived from the media content and media content structures. The media is encapsulated in a hierarchy of boxes. A box is an object-oriented building block defined by a unique type identifier.

In an example, the presentation of media content is referred to as a movie and is divided into tracks that are parallel in term of time. Each track represents a timed sequence of samples of media content. Media content are stored and accessed by access units, such as frames, and the like. The access unit is defined as the smallest individually accessible portion of data within an elementary stream, and unique timing information can be attributed to each access unit. In an embodiment, access units can be stored physically in any sequence and/or any grouping, intact or subdivided into packets. The ISO base media file format uses the boxes to map the access units to a stream of samples using references to byte positions where the access units are stored. In an example, the sample information allows access units to be decoded and presented synchronously on a timeline, regardless of storage.

According to an aspect of the disclosure, the processing circuitry 120 is configured to include visual track composition information in metadata. In an example, the processing circuitry 120 generates a transform property box for a derived track that is a composition of multiple visual tracks (e.g., primary visual track and secondary visual tracks). The processing circuitry 120 includes the visual track composition information in the transform property box. In another example, the processing circuitry 120 generates a sub-picture composition box for a group of sub-picture visual tracks. The processing circuitry 120 includes the visual track composition information in the sub-picture composition box.

In an embodiment, the processing circuitry 120 is implemented using one or more processors, and the one or more processors are configured to execute software instructions to perform media data processing. In another embodiment, the processing circuitry 120 is implemented using integrated circuits.

In the FIG. 1 example, the encapsulated media data is provided to the delivery sub-system 150 via the interface circuitry 111. The delivery sub-system 150 is configured to suitably provide the media data to client devices, such as the rendering sub-system 160.

In an embodiment, the delivery sub-system 150 includes various network elements, such as routers, network switches, base stations, access points and the like to form a delivery path between the source sub-system 110 and the rendering sub-system 160. In an example, the source sub-system 110 sends a media presentation to the rendering sub-system 160 via the delivery sub-system 150. The components of the delivery system 150 are suitably coupled together via wired and/or wireless connections. The delivery system 150 is suitably coupled with the source system 110 and the rendering system 160 via wired and/or wireless connections.

The rendering sub-system 160 can be implemented using any suitable technology. In an example, components of the rendering sub-system 160 are assembled in a device package. In another example, the rendering sub-system 160 is a distributed system, components of the source sub-system 110 can be located at different locations, and are suitable coupled together by wire connections and/or wireless connections.

In the FIG. 1 example, the rendering sub-system 160 includes an interface circuitry 161, a processing circuitry 170 and a display device 165 coupled together. The interface circuitry 161 is configured to suitably receive media information, such as files of media presentation, media stream and the like via any suitable communication protocol.

The processing circuitry 170 is configured to process the media information and generate images for the display device 165 to present to one or more users. The display device 165 can be any suitable display, such as a television, a smart phone, a wearable display, a head-mounted device, and the like.

In an example, the processing circuitry 170 includes a processing module 180 and an image generation module 190. The processing module 180 is configured to perform packet processing, control and communication operations. The image generation module 190 is configured to generate images for display. The processing module 180 and the image generation module 190 can be implemented as processors executing software instructions or can be implemented as integrated circuits.

According to an aspect of the disclosure, the rendering sub-system 160 can process metadata that is constructed by the source sub-system 110. In an embodiment, the source sub-system 110 sends a media file to the rendering sub-system 160 via the delivery sub-system 150. The media file includes metadata for visual track composition.

In an embodiment, the processing circuitry 170 can parse the metadata to extract information for visual track composition. In an example, the media file includes visual tracks and media samples, and the processing circuitry 170 can generate images for display based on the information for visual track composition. In another example, the processing circuitry 170 can determine visual tracks that can provide visual data for a region of interest for example. The processing circuitry 170 can generate a request to request the visual data of the determined visual tracks. The request can be sent out by the interface circuitry 161, and received by the source sub-system 110. The source sub-system 110 can provide the visual data of the determined visual tracks, and can transmit signals carrying the visual data. The interface circuitry 161 can then receive signals carrying the visual data of the determined visual tracks. Then, the processing circuitry 170 can generate images based on the information for visual track composition based on the received visual data.

Figure 2:
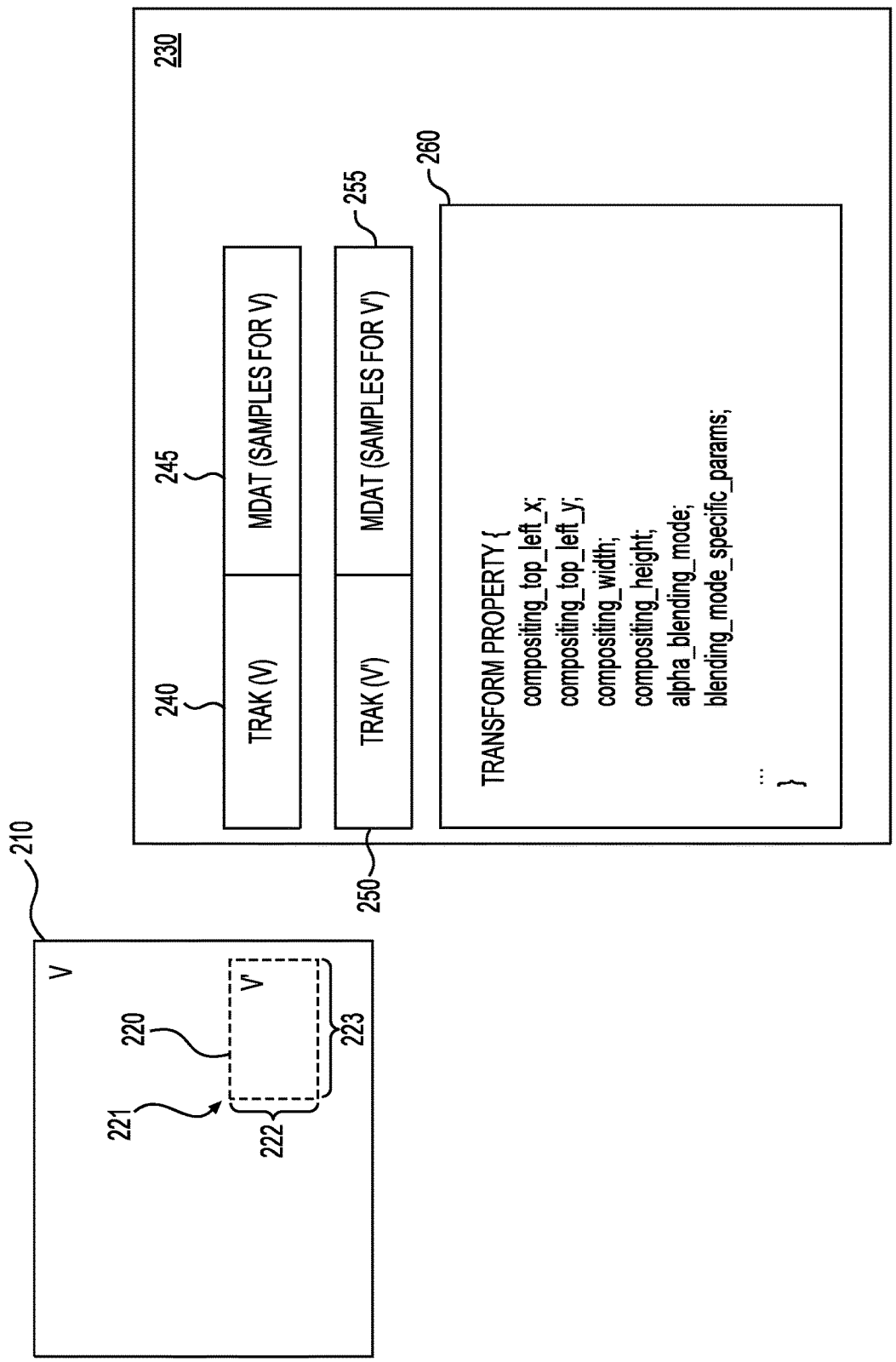
FIGS. 2-3 show diagrams of media files according to some embodiments of the disclosure.

FIG. 2 shows a diagram illustrating a visual content and a corresponding media file 230 according to some embodiments of the disclosure. In an example, the media file 230 is generated by the processing circuitry 120 in the source sub-system 110. For example the processing circuitry 120 includes visual track composition information in the media file 230. The media file 230 is transmitted from the source sub-system 110 to the rendering sub-system 160 by the deliver sub-system 150. Then, the processing circuitry 170 in the rendering sub-system 160 can parse the media file 230, and generate images for display based on, for example, visual track composition information in the media file 230.

The visual content includes visual samples of different spatial attributes. For example, the visual content includes visual data for a primary visual view 210 (e.g., for playing a movie), and a secondary visual view 220 (e.g., for playing an advertisement). The visual data for the primary visual view 210 can form a visual track V that provides video in the primary visual view 210. The visual data for the secondary visual view 220 can form a visual track V' that provides video in the secondary visual view 220.

As shown in FIG. 2, the file 230 includes track boxes for visual tracks and transform property box for a derived track. For example, the file 230 includes a track box 240 for the primary visual track (also referred to as video) V. The track box 240 includes a media box 245 that can include indexes to the video samples for the primary visual track V. Similarly, the file 230 includes a track box 250 for the secondary visual track V'. The track box 250 includes a media box 255 that can include indexes to the video samples for generating the secondary video V'. Further, the file 230 includes a transform property box 260 to include visual track composition information for a derived visual track that is a composite of the primary visual track V and the secondary visual track V'.

In the FIG. 2 example, the visual track composition information includes spatial composition information, and alpha composition information. Specifically, the spatial composition information specifies a position and sizes of a rectangular region for visual track composition. The position of the rectangular region is specified using coordinates of a specific point, such as top left corner 221 of the rectangular region. The position of the rectangular region is provided by (compositing_top_left_x, compositing_top_left_y). The sizes of the rectangular region is specified using a width 223 (e.g., compositing_width), and a height 222 (e.g., compositing_height) of the rectangular region. Further, the visual composition information specifies an alpha compositing mode (e.g., alpha_blending_mode), and parameters associated with the alpha compositing mode (e.g., blending_mode_specific_params). In an example, the alpha compositing mode is pre-defined, such as Table 1 of the Appendix A.

The syntax and semantics for transform property are disclosed in the U.S. Provisional Application No. 62/475,244, which is included in the Appendix A.

Figure 3:
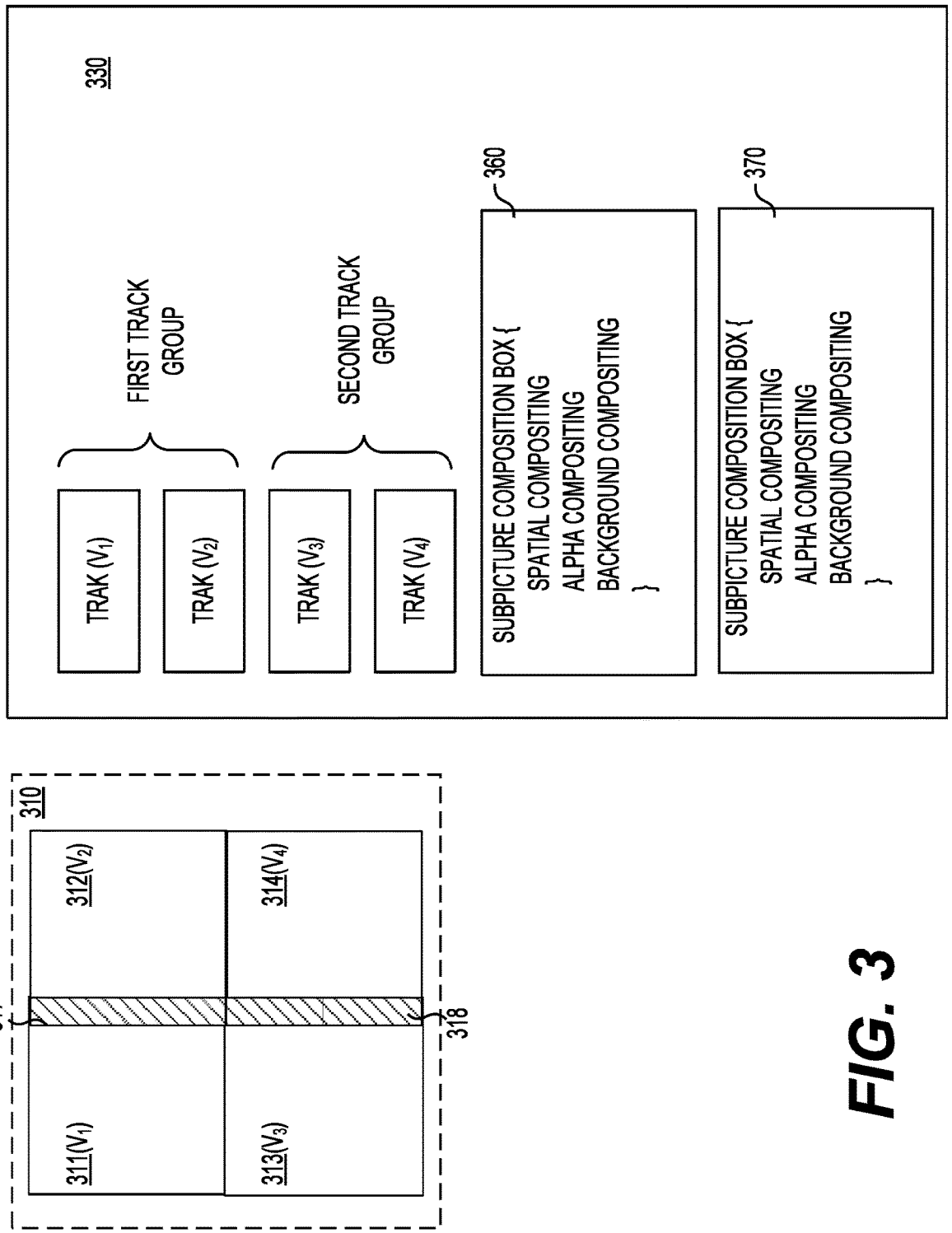

FIG. 3 shows a diagram illustrating a visual content and a corresponding media file 330 according to some embodiments of the disclosure. In an example, the media file 330 is generated by the processing circuitry 120 in the source sub-system 110. For example the processing circuitry 120 includes visual track composition information in the media file 330. The media file 330 is transmitted from the source sub-system 110 to the rendering sub-system 160 by the deliver sub-system 150. Then, the processing circuitry 170 in the rendering sub-system 160 can parse the media file 330, and generate images for display based on, for example, visual track composition information in the media file 330.

The visual content includes visual samples of different spatial attributes. In an example, image frames are captured for a relatively large view 310. The relatively large view 310 can be partitioned into multiple region views 311-314, and the image frames of the relatively large view are partitioned into sub-pictures for multiple region views. In the FIG. 3 example, the region view 311 and the region view 312 are overlapping, and the overlapped region is shown as 317. The region view 313 and the region view 314 are overlapping, and the overlapped region is shown as 318. The visual data for the region view 311 can form a visual track $V_1$ that provides video in the region visual view 311. The visual data for the region view 312 can form a visual track $V_2$ that provides video in the region visual view 312. The visual data for the region view 313 can form a visual track $V_3$ that provides video in the region visual view 313. The visual data for the region view 314 can form a visual track $V_4$ that provides video in the region visual view 314.

As shown in FIG. 3, the file 330 includes track boxes for visual tracks $V_1$-$V_4$ and sub-picture composition boxes for track groups. For example, the visual tracks $V_1$ and $V_2$ form a first track group, and the visual tracks $V_3$ and $V_4$ form a second track group. The file 330 includes a sub-picture composition box 360 for the first track group, and includes a sub-picture composition box 370 for the second track group. The sub-picture composition box 360 includes visual track composition information, such as spatial composting, alpha compositing and background compositing information, for the first track group. The sub-picture composition box 370 includes visual track composition information, such as spatial composting, alpha compositing and background compositing information, for the second track group.

Examples of the sub-picture composition boxes are shown in FIGS. 4-8.

FIG. 4 shows a sub-picture composition box 400 according to an embodiment of the disclosure. The sub-picture composition box 400 includes size parameters of a rectangular region, such as a width (e.g., compositing_width), and a height (e.g., compositing_height) of the rectangular region. In the FIG. 4 example, the sub-picture composition box 400 uses flags to indicate whether additional spatial compositing information, alpha compositing information, and background compositing information are provided in the sub-picture composition box level. For example, matrix_flag is zero, which indicates that additional spatial compositing information is not provided in the sub-picture composition box level. In an example, spatial compositing information in the movie header (e.g., a movie header box) or a track header (e.g., a track header box) can be used for spatial compositing. Further, the blending_flag is zero, which indicates that alpha compositing information is not provided in the sub-picture composition box level. Therefore no blending processing is required in an example. Further, the background_flag is zero which indicates that background compositing information is not provided in the sub-picture composition box level. Therefore no background processing is required in an example.

FIG. 5 shows a sub-picture composition box 500 according to an embodiment of the disclosure. The sub-picture composition box 500 includes size parameters of a rectangular region, such as a width (e.g., compositing_width), and a height (e.g., compositing_height) of the rectangular region. In the FIG. 5 example, the sub-picture composition box 500 uses flags to indicate whether additional spatial compositing information, alpha compositing information, and background compositing information are provided in the sub-picture composition box level. For example, matrix_flag is one which indicates that the spatial compositing information, such as a matrix, is provided in the sub-picture composition box level. Thus, the matrix in the sub-picture composition box 500 is used for spatial compositing. It is noted that matrixes in the movie header or the track header can be ignored.

Further, in the FIG. 5 example, width specifies, in luma sample units, the width of the samples of this track on the composition picture; height specifies, in luma sample units, the height of the samples of this track on the composition picture; and layer specifies the front-to-back ordering of video tracks.

FIG. 6 shows a sub-picture composition box 600 according to an embodiment of the disclosure. The sub-picture composition box 600 includes size parameters of a rectangular region, such as a width (e.g., compositing_width), and a height (e.g., compositing_height) of the rectangular region. In the FIG. 6 example, the sub-picture composition box 600 uses flags to indicate whether spatial compositing information, alpha compositing information, and background compositing information are provided in the sub-picture composition box level. For example, matrix_flag is one which indicates that the spatial compositing information (e.g., matrix) is provided in the sub-picture composition box level. Thus, the matrix in the sub-picture composition box 600 is used and matrix in the movie header or the track header can be ignored.

Further, in the FIG. 6 example, the blending_flag is one which indicates that alpha compositing information is provided in the sub-picture composition box level. For example, the alpha compositing information is provided as alpha_blending_mode and blending_mode_specific params[ ].

FIG. 7 shows a sub-picture composition box 700 according to an embodiment of the disclosure. The sub-picture composition box 700 includes size parameters of a rectangular region, such as a width (e.g., compositing_width), and a height (e.g., compositing_height) of the rectangular region. In the FIG. 7 example, the sub-picture composition box 700 uses flags to indicate whether spatial compositing information, alpha compositing information, and background compositing information are provided in the sub-picture composition box level. For example, matrix_flag is one which indicates that the spatial compositing information (e.g., matrix) is provided in the sub-picture composition box level. Thus, the matrix in the sub-picture composition box 700 is used and matrix in the movie header or the track header can be ignored.

Further, in the FIG. 7 example, the blending_flag is one, which indicates that alpha compositing information is provided in the sub-picture composition box level. For example, the alpha compositing information is provided as alpha_blending_mode and blending_mode_specific params[ ].

Further, in the FIG. 7 example, background_flag is two, which indicates that background is a static image, and the image identification (e.g., image_item_ID) of the static image is provided in the sub-picture composition box level.

FIG. 8 shows a sub-picture composition box 800 according to an embodiment of the disclosure. The sub-picture composition box 800 includes size parameters of a rectangular region, such as a width (e.g., compositing_width), and a height (e.g., compositing_height) of the rectangular region. In the FIG. 8 example, the sub-picture composition box 800 uses flags to indicate whether spatial compositing information, alpha compositing information, and background compositing information are provided in the sub-picture composition box level.

For example, matrix_flag can be variable, and determined at a later time, such as a rendering time. When the matrix_flag is zero, the matrix provided in the movie header or the track header can be used for spatial compositing. When the matrix_flag is one, the matrix provided in the sub-picture composition box 800 is used for spatial compositing.

Further, in the FIG. 8 example, the blending_flag can be variable, and determined at a later time. When the blending_flag is zero, no alpha compositing information is present. When the blending_flag is one, alpha compositing information provided in the sub-picture composition box level can be used for alpha compositing.

Further, in the FIG. 8 example, background_flag can be variable, and determined at a later time. When the background_flag is one, a solid color is used for background. When the background_flag is two, a static image that is identified by the image identification (e.g., image_item_ID) is used for background. When the background_flag is three, a video is used for background. The video is identified by a video track identification (e.g., video_track_ID).

The syntax and semantics for subpicture composition box are disclosed in the U.S. Provisional Application No. 62/518,637, which is included in the Appendix B, U.S. Provisional Application No. 62/531,378, which is included in the Appendix C, and U.S. Provisional Application No. 62/570,697, which is included in the Appendix D.

Figure 9:
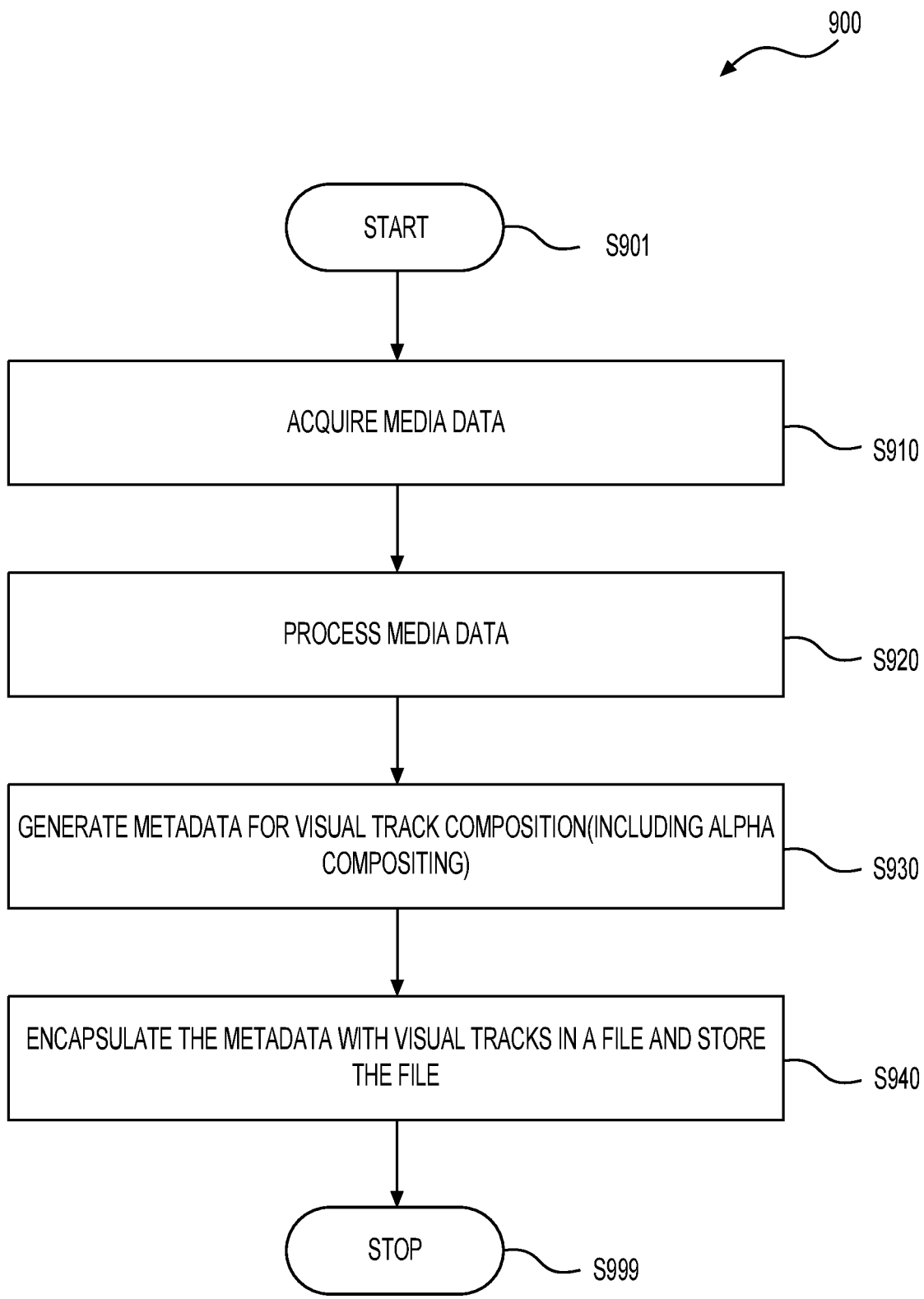
FIG. 9 shows a flow chart outlining a process example 900 according to an embodiment of the disclosure.

FIG. 9 shows a flow chart outlining a process example 900 according to an embodiment of the disclosure. In an example, the process 900 is executed by the source subsystem 110 in the FIG. 1 example. The process starts at S901 and proceeds to S910.

At S910, media data is acquired. In an example, the acquisition device 112 includes a camera rig with multiple cameras to take images of various directions in a surrounding space. In some other embodiments, the media data is acquired from more than one source devices, which should not be limited in this disclosure.

At S920, the visual data is processed to generate visual samples and form visual tracks. In an example, the processing circuitry 120 can stitch images taken from different cameras together to form a stitched image, such as an omnidirectional image, and the like. Then, the processing circuitry 120 can project the image according to suitable two-dimension (2D) plane to convert the image to 2D images. In an example, the 2D plane can be divided into sub-picture regions (partitions), and the processing circuitry 120 forms visual tracks of different visual views. The processing circuitry 120 then generates track boxes to respectively correspond to the visual tracks. A track box for a visual track can include data indexes that point to a subset of visual samples to form the visual track.

At S930, metadata for visual track composition is determined and included in suitable box. In an example, the metadata for visual track composition is included in a transform property box. In another example, the metadata for visual track composition is included in a sub-picture composition box. In an embodiment, flags are used to indicate whether to use spatial compositing information, alpha compositing information, and background compositing information provided in a sub-picture composition box or to use spatial compositing information provided in a movie header box or a track header box.

At S940, the visual tracks and the metadata are encapsulated in a file. In an example, the visual tracks, the metadata are encapsulated in a file (e.g., the file 230, the file 330) that conforms to the ISOBMFF. The file is suitably stored in an example. Then the process proceeds to S999 and terminates.

Figure 10:
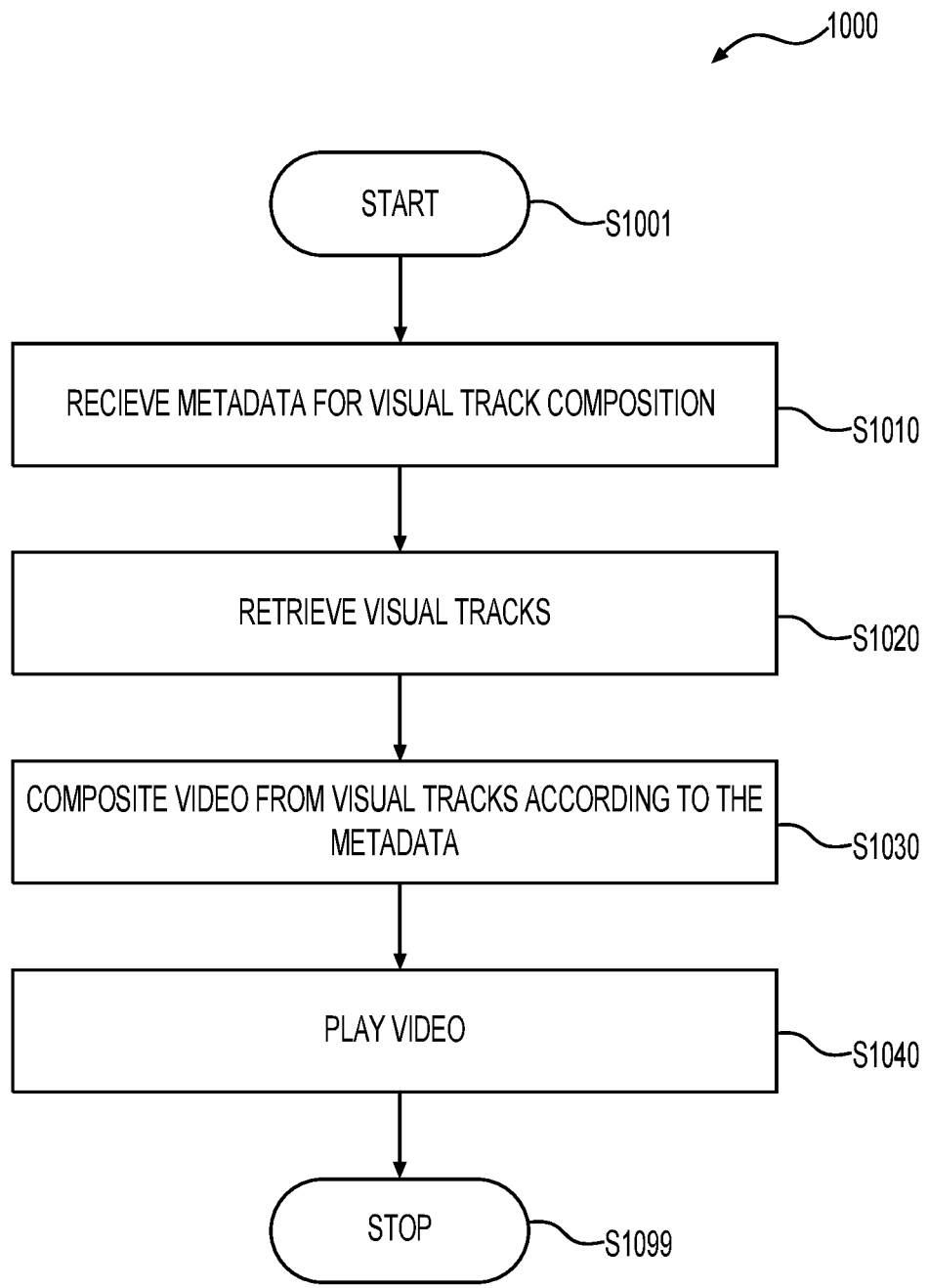
FIG. 10 shows a flow chart outlining a process example 1000 according to an embodiment of the disclosure.

FIG. 10 shows a flow chart outlining a process example 1000 according to an embodiment of the disclosure. In an example, the process 1000 is executed by the rendering sub-system 160 in the FIG. 1 example. The process 1000 starts at S1001 and proceeds to S1010.

At S1010, metadata for visual track composition is received. In an example, the source sub-system 110 generates a media file, such as the media file 230, the media file 330, and the like that includes metadata (e.g., metadata track) that include configuration information for visual track composition from multiple visual tracks. In an embodiment, the processing circuitry 170 can parse the metadata to extract the configuration information for visual track composition, such as spatial compositing information, alpha compositing information, and background compositing information, and the like.

At S1020, visual tracks are retrieved. In an example, the rendering sub-system 160 determines a region of interest, and determines visual tracks that provide visual data for the region of interest. In an example, the processing circuitry 170 can generate a request to request the visual data of the determined visual tracks. The request can be sent out by the interface circuitry 161. The interface circuitry 161 can then receive signals carrying the visual data of the determined visual tracks.

At S1030, a video is generated by combining the visual tracks based on the configuration information for visual track composition. In an example, the processing circuitry 170 combines samples respectively from the visual tracks to generate a composite sample based on the configuration information for the visual track composition.

At S1040, the generated video is played. Then, the process proceeds to S1099 and terminates.

APPENDIX A

A-1: Definition

| Box Type: | 'alcp' |
|---|---|
| Mandatory (per sample): | No |
| Quantity (per sample): | Any |

The alpha compositing transform provides alpha blending of two entities, such as two samples with each from one of two visual tracks, in colours and compositing locations of the output. The output co-located pixel value is computed in terms of the alpha blending algorithms specified in a separate document, e.g. ISO-IEC 23001-8 Coding-independent code points (CICP) or W3C recommendation [5].

A-2: Syntax

```
aligned(8) class AlphaCompositing
extends TransformProperty('alcp') {
    unsigned int(16) compositing_top_left_x;
    unsigned int(16) compositing_top_left_y;
    unsigned int(16) compositing_width;
    unsigned int(16) compositing_height;
    unsigned int(8)  alpha_blending_mode;
    unsigned int[ ]  blending_mode_specific_params;
    unsigned int(8)  reserved;
}
```

A-3: Semantics compositing_top_left_x, compositing_top_left_y specify the top-left corner of the compositing space relative to the reference coordinate origin which may be specified by an application, or by a container format containing the base track and tile tracks of media data.

compositing_width, compositing_height specify the width and height of the output image after composition.

alpha_blending_mode specifies the alpha_blending_mode with valid values in the exemplar table below. A formal such table and the associated algorithms with default parameters may be defined in a separate document, e.g. ISO/IEC 23001-8 or W3C recommendation. The parameter value of 'layer' in TrackHeaderBox of each tracks which specifies the front-to-back ordering of visual tracks[4] may be set and used as a relative front and back layer indicator for compositing two tracks. In the table, term 'Source' and term 'Destination' are used interchangeably for the front/top layer and the back/bottom layer or the backdrop, respectively.

TABLE 1

Predefined Alpha Blending Modes

| Value | Compositing mode | Description |
|---|---|---|
| 1 | Clear | No regions are enabled. |
| 2 | Source | Only the source will be present. |
| 3 | Destination | Only the destination will be present. |
| 4 | Source Over | Source is placed over the destination. |
| 5 | Destination Over | Destination is placed over the source. |
| 6 | Source In | Source that overlaps the destination, replaces the destination. |
| 7 | Destination In | Destination which overlaps the source, replaces the source. |
| 8 | Source Out | Source is placed, where it falls outside of the destination. |
| 9 | Destination Out | Destination is placed, where it falls outside of the source. |
| 10 | Source Atop | Source which overlaps the destination, replaces the destination. Destination is placed elsewhere. |
| 11 | Destination Atop | Destination which overlaps the source replaces the source. Source is placed elsewhere. |
| 12 | XOR | The non-overlapping regions of source and destination are combined. |
| 13~16 | Reserved | |

TABLE 1-continued

Predefined Alpha Blending Modes

| Value | Compositing mode | Description |
|---|---|---|
| 17 | Dissolve | Takes random pixels from both layers. With high opacity, most pixels are taken from the source layer. With low opacity most pixels are taken from the destination layer. |
| 18 | Plus | Display the sum of the source image and destination image. |
| 19 | Multiply | The source color is multiplied by the destination color and replaces the destination. |
| 20 | Screen | The values of the pixels in the two layers are inverted, multiplied, and then inverted again |
| 21 | Overlay | Overlay combines Multiply and Screen blend modes. |
| 22 | Darken | Selects the darker of the destination and source colors. |
| 23 | Lighten | Selects the lighter of the destination and source colors |
| 24 | Color_dodge | Brightens the destination color to reflect the source color |
| 25 | Color_burn | Darkens the destination color to reflect the source color |
| 26 | Hard_light | Multiplies or screens the colors, depending on the source color value. |
| 27 | Soft_light | Darkens or lightens the colors, depending on the source color value. |
| 28 | Difference | Subtracts the darker of the two constituent colors from the lighter color |
| 29 | Exclusion | Produces an effect similar to that of the Difference mode but lower in contrast. |
| 30~255 | Reserved | For new modes or non-separable blending modes. | blending_mode_specific_params specify optional parameters with a given blending mode other than using those of default values specified in, e.g. ISO/IEC 23001-8, it may include alpha channel data.

APPENDIX B

The disclosure provides a wide sense media composition which consists of not only spatial placement but also spatial transformation including blending for presentations. The proposed syntax and semantics for sub-picture composition box is as follows.

```
aligned(8) class SubPictureCompositionBox extends
TrackGroupTypeBox('spco') {
        unsigned int(16) composition_width;
        unsigned int(16) composition_height;
        unsigned int(1) matrix_flag;
        unsigned int(1) blending flag;
        unsigned int(6) reserved = 0
        if(matrix_flag == 1){
            template int(32)[9] matrix=
        { 0x00010000,0,0,0,0x00010000,0,0,0,0x40000000 };
            // unity matrix
            unsigned int(32) width;
            unsigned int(32) height;
            template int(16) layer = 0;
        }
        // other composition info can be added here
    if(blending_flag ==1){
            unsigned int(8) alpha_blending_mode;
            unsigned int(8) blending_mode_specific_params[ ] =
            0;
        }
}
``` composition_width specifies, in luma sample units, the width of the composed picture. composition_height specifies, in luma sample units, the height of the composed picture.

matrix provides a transformation matrix {a,b,u, c,d,v, x,y,w} for the video[?]; (u,v,w) are restricted here to (0,0,1), hex values (0,0,0x40000000).

width specifies, in luma sample units, the width of the samples of this track on the composed picture.

height specifies, in luma sample units, the height of the samples of this track on the composed picture.

layer specifies the front-to-back ordering of video tracks; composition_width shall be greater than or equal to x+width. composition_height shall be greater than or equal to y+height.

matrix, width, height, and layer have the same semantics as in when the track is used for presentation, if present, they override respectively matrix, width, height, layer in TrackHeaderBox. Otherwise, if not present, matrix, width, height, layer in TrackHeaderBox shall be used in which the value of flags is 0x000002 (for presentation) for width, height.

alpha_blending_mode specifies the alpha blending mode with valid values in the exemplar table below. A formal such table and the associated algorithms with default parameters may be defined in a separate document, e.g. ISO/IEC 23001-8 or W3C recommendation [3]. The parameter value of 'layer' in TrackHeaderBox of each tracks which specifies the front-to-back ordering of visual tracks may be set and used as a relative front and back layer indicator for compositing two tracks.

blending_mode_specific_params specify optional parameters with a given blending mode other than using those of default values specified in, e.g. ISO/IEC 23001-8, it may include alpha channel data.

As the first embodiment, the SubPictureCompositionBox is present without providing matrix and blending information, as the following.

```
aligned(8) class SubPictureCompositionBox extends
TrackGroupTypeBox('spco') {
        unsigned int(16) composition_width;
        unsigned int(16) composition_height;
        unsigned int(1) matrix_flag = 0;
        unsigned int(1) blending flag = 0;
        unsigned int(6) reserved = 0
}
```

As the second embodiment, the SubPictureCompositionBox is present without providing blending information, as the following.

```
aligned(8) class SubPictureCompositionBox extends
TrackGroupTypeBox('spco') {
        unsigned int(16) composition_width;
        unsigned int(16) composition_height;
        unsigned int(1) matrix_flag = 1;
        unsigned int(1) blending flag = 0;
        unsigned int(6) reserved = 0
    template int(32)[9] matrix=
        { 0x00010000,0,0,0,0x00010000,0,0,0,0x40000000 };
            // unity matrix
        unsigned int(32) width;
        unsigned int(32) height;
        template int(16) layer;
}
```

In the above two embodiments, the current OMAF sub-picture composition design is well mapped into them with either explicitly providing the matrix values in the box or implicitly using the matrix values in TrackHeaderBox for compositing presentations.

The proposed design in this disclosure is a superset case of the current OMAF one, in which the translational transformation case covers the current OMAF sub-picture composition design.

As the third embodiment, furthermore, the SubPictureCompositionBox is present with all information for composition, as the following.

```
aligned(8) class SubPictureCompositionBox extends
TrackGroupTypeBox('spco') {
        unsigned int(16) composition_width;
        unsigned int(16) composition_height;
        unsigned int(1) matrix_flag = 1;
        unsigned int(1)  blending flag = 1;
        unsigned int(6)  reserved = 0
    template int(32)[9] matrix=
        { 0x00010000,0,0,0,0x00010000,0,0,0,0x40000000 };
            // unity matrix
        unsigned int(32) width;
        unsigned int(32) height;
        template int(16) layer = 0;
        // other composition info can be added here
    unsigned int(8) alpha_blending_mode;
    unsigned int(8) blending_mode_specific_params[ ];
}
```

In this case, the proposed design may perform rich transformations including spatial placement, rotation, scaling, and blending in the sub-picture composition for presentations.

APPENDIX C

The matrix defined in the above two headers can be used to perform various transformation, such, translational, rotation, and scaling etc. However, in the OMAF DIS specification, the defined SubPictureCompositionBox ('spco') may only perform the spatial placement for the sub-picture tracks. Moreover, there may be the cases that sub-pictures overlap each other and may need to show various blending effects during presentation, e.g., an AR picture track may impose on other pictures tracks or merge in various ways for presentations.

The proposed design in this disclosure is a wide sense media composition which consists of not only spatial placement but also spatial transformation including blending and background for presentations. The proposed syntax and semantics for sub-picture composition box as below.

```
aligned(8) class SubPictureCompositionBox extends
TrackGroupTypeBox('spco') {
        unsigned int(16) composition_width;
        unsigned int(16) composition_height;
        unsigned int(1) matrix_flag;
        unsigned int(1) blending flag;
    unsigned int(2) background_flag;
        unsigned int(4) reserved = 0
        if(matrix_flag == 1){
            template int(32)[9] matrix=
        { 0x00010000,0,0,0,0x00010000,0,0,0,0x40000000 };
            // unity matrix
            unsigned int(32) width;
            unsigned int(32) height;
            template int(16) layer;
        }
        // other composition info can be added here
    if(blending_flag ==1){
                unsigned int(8) alpha_blending_mode;
                unsigned int(8) blending_mode_specific_params[ ];
        }
    if ((background_flag & 1) == 1) // background color
            for (j=0; j<4; j++)
                unsigned int(16) canvas_fill_value;
    if ((background_flag & 2) == 2) // background image
            unsigned int(16) image_item_ID;
    if ((background_flag & 3) == 1) // background video
            unsigned int(16) video_track_ID;
}
``` composition_width specifies, in luma sample units, the width of the composition picture. composition_height specifies, in luma sample units, the height of the composition picture.

matrix provides a transformation matrix {a,b,u, c,d,v, x,y,w} for the video[?]; (u,v,w) are restricted here to (0,0,1), hex values (0,0,0x40000000).

width specifies, in luma sample units, the width of the samples of this track on the composition picture.

height specifies, in luma sample units, the height of the samples of this track on the composition picture.

layer specifies the front-to-back ordering of video tracks; composition_width shall be greater than or equal to x+width. composition_height shall be greater than or equal to y+height.

matrix, width, height, and layer have the same semantics as in [2] when the track is used for presentation, if present, they override respectively matrix, width, height, layer in TrackHeaderBox. Otherwise, if not present, matrix, width, height, layer in TrackHeaderBox shall be used in which the value of flags is 0x000002 (for presentation) for width, height.

alpha_blending_mode specifies the alpha blending mode with valid values in the exemplar table below. A formal such table and the associated algorithms with default parameters may be defined in a separate document, e.g. ISO/IEC 23001-8, ISO/IEC 23091-1 or W3C recommendation [3]. The parameter value of 'layer' in TrackHeaderBox of each tracks which specifies the front-to-back ordering of visual tracks may be set and used as a relative front and back layer indicator for compositing two tracks. In the table, term 'Source' and term 'Destination' are used interchangeably for the front/top layer and the back/bottom layer or the backdrop, respectively.

blending_mode_specific_params specify optional parameters with a given blending mode other than using those of default values specified in, e.g. ISO/IEC 23001-8, it may include alpha channel data.

As the first embodiment, the SubPictureCompositionBox is present without providing matrix and other information, as the following.

```
aligned(8) class SubPictureCompositionBox extends
TrackGroupTypeBox('spco') {
        unsigned int(16) composition_width;
        unsigned int(16) composition_height;
        unsigned int(1) matrix_flag = 0;
        unsigned int(1) blending flag = 0;
    unsigned int(2) background_flag = 0;
        unsigned int(4) reserved = 0
}
```

As the second embodiment, the SubPictureComposition-Box is present with matrix information, as the following.

```
aligned(8) class SubPictureCompositionBox extends
TrackGroupTypeBox('spco') {
        unsigned int(16) composition_width;
        unsigned int(16) composition_height;
        unsigned int(1) matrix_flag = 1;
        unsigned int(1) blending flag = 0;
    unsigned int(2) background_flag = 0;
        unsigned int(4) reserved = 0
        template int(32)[9]  matrix=
            { 0x00010000,0,0,0,0x00010000,0,0,0,0x40000000 };
                // unity matrix
        unsigned int(32) width;
        unsigned int(32) height;
        template int(16) layer;
}
```

In the above two embodiments, the current OMAF sub-picture composition design is well mapped with either explicitly providing the matrix values in the box or implicitly using the matrix values in TrackHeaderBox for compositing presentations.

The proposed design in this disclosure is a superset case of the current OMAF one, in which the translational transformation case covers the current OMAF sub-picture composition design.

As the third embodiment, the SubPictureCompositionBox is present with matrix and blending information for composition, as the following.

```
aligned(8) class SubPictureCompositionBox extends
TrackGroupTypeBox('spco') {
        unsigned int(16) composition_width;
        unsigned int(16) composition_height;
        unsigned int(1) matrix_flag = 1;
        unsigned int(1) blending flag = 1;
    unsigned int(2) background_flag = 0;
        unsigned int(4) reserved = 0
        template int(32)[9]  matrix=
            { 0x00010000,0,0,0,0x00010000,0,0,0,0x40000000 };
                // unity matrix
        unsigned int(32) width;
        unsigned int(32) height;
        template int(16) layer;
                // other composition info can be added here
        unsigned int(8) alpha_blending_mode;
        unsigned int(8) blending_mode_specific_params[ ];
}
```

The blending information may be provided and used with the matrix values in TrackHeaderBox if the matrix flag is set to 0.

As the forth embodiment, furthermore, the SubPictureCompositionBox is present with all information for composition, as the following.

```
aligned(8) class SubPictureCompositionBox extends
TrackGroupTypeBox('spco') {
        unsigned int(16) composition_width;
        unsigned int(16) composition_height;
        unsigned int(1) matrix_flag = 1;
        unsigned int(1) blending flag = 1;
    unsigned int(2) background_flag = 2; //background image
        unsigned int(4) reserved = 0
        template int(32)[9]  matrix=
            { 0x00010000,0,0,0,0x00010000,0,0,0,0x40000000 };
                // unity matrix
        unsigned int(32) width;
        unsigned int(32) height;
        template int(16) layer;
                // other composition info can be added here
        unsigned int(8) alpha_blending_mode;
        unsigned int(8) blending_mode_specific_params[ ];
    unsigned int(16) image_item_ID;
}
```

In this disclosure, the proposed design may perform rich transformations including spatial placement, rotation, scaling, and blending with background settings in the sub-picture composition for presentations.

APPENDIX D

The above defined new box SubPictureRegionBox ('sprg') may only perform the spatial placement for the sub-picture rectangles. And the relationship of sub-picture rectangle dimension (track_width, track_height) in SubPictureRegionBox is not clearly associated with the existing track dimension (width, height) for presentation in TrackHeaderBox.

In MPEG File Format[2], the syntax element matrix is defined in TrackHeaderBox 'trkd' for processing decoded track media for presentation, see the following syntax.

```
aligned(8) class TrackHeaderBox
    extends FullBox('tkhd', version, flags){
        if (version==1) {
            unsigned int(64)   creation_time;
            unsigned int(64)   modification_time;
            unsigned int(32)   track_ID;
            const unsigned int(32)   reserved = 0;
            unsigned int(64)   duration;
        } else { // version==0
            unsigned int(32)   creation_time;
            unsigned int(32)   modification_time;
            unsigned int(32)   track_ID;
            const unsigned int(32)   reserved = 0;
            unsigned int(32)   duration;
        }
        const unsigned int(32)[2]   reserved = 0;
        template int(16) layer = 0;
        template int(16) alternate_group = 0;
        template int(16)  volume = {if track_is_audio 0x0100 else 0};
        const unsigned int(16)    reserved = 0;
        template int(32)[9]  matrix=
            { 0x00010000,0,0,0,0x00010000,0,0,0,0x40000000 };
                // unity matrix
        unsigned int(32) width;
        unsigned int(32) height;
}
```

The matrix values:
  Which occur in the headers specify a transformation of video images for presentation.
  If a matrix is used, the point (p,q) is transformed into (p', q') using the matrix as follows:

$$(p\ q\ 1) * \begin{vmatrix} a & b & u \\ c & d & v \\ x & y & w \end{vmatrix} = (m\ n\ z)$$

$$m = ap + cq + x;\ n = bp + dq + y;\ z = up + vq + w;$$

$$p' = m/z;\ q' = n/z$$

The coordinates {p,q} are on the decompressed frame, and {p', q'} are at the rendering output. Therefore, for example, the matrix {2,0,0, 0,2,0, 0,0,1} exactly doubles the pixel dimension of an image.

The values in the matrix are stored in the order {a,b,u, c,d,v, x,y,w}.

All the values in a matrix are stored as 16.16 fixed-point values, except for u, v and w, which are stored as 2.30 fixed-point values.

For some examples, the matrix {1,0,0, 0,1,0, 0,0,4} is unity matrix; the matrix {2,0,0, 0,2,0, 0,0,1} exactly doubles the pixel dimension of an image; the matrix {1,0,0, 0,1,0, 20,30,4} is unity matrix with translation of (20, 30). Therefore {x,y} can, for example, be considered a translation vector for the picture.

Each track is composed using its matrix as specified into an overall image; this is then transformed and composed according to the matrix at the movie level in the MovieHeaderBox.

The existing matrix defined in the track header can be used to perform various transformation for sub-picture composition in OMAF and it should be clearly associated with the elements in SubPictureRegionBox. The proposed design in this contribution is a wide sense sub-track composition which consists of not only spatial placement but also spatial transformation, such as, translation, rotation, and scaling etc. The proposed syntax and semantics for sub-picture region box SubPictureRegionBox are as below with the highlighted changes on the current DIS text. And 'luma pixel' is used for 'luma sample', as 'sample' in the file format and OMAF may refer to a picture.

```
aligned(8) class SubPictureRegionBox extends FullBox('sprg',0,0) {
    unsigned int(1) matrix_flag;
    unsigned int(7) reserved = 0
    if(matrix_flag == 1){
        template int(32)[9]  matrix=
            { 0x00010000,0,0,0,0x00010000,0,0,0,0x40000000 };
            // unity matrix
    }
    unsigned int(16) composition_width;
    unsigned int(16) composition_height;
}
``` matrix_flag equal to 1, specifies that there is a new matrix to be used for the sub-track composition, when equal to 0, indicate there is no other matrix than those in the track header TrackHeaderBox.

matrix, provides a transformation matrix {a,b,u, c,d,v, x,y,w} for the video; (u,v,w) are restricted here to (0,0,1), hex values (0,0,0x40000000). It has the same semantics as matrix in TrackHeaderBox. When matrix_flag equal to 0, it is set equal to matrix in TrackHeaderBox.

track_x equal to x, specifies, in luma pixel units, the horizontal position of the top-left corner of the samples of this track on the composition picture. The value of track_x shall be in the range of 0 to composition_width−1, inclusive.

track_y equal to y, specifies, in luma pixel units, the vertical position of the top-left corner of the samples of this track on the composition picture. The value of track_y shall be in the range of 0 to composition_height−1, inclusive.

track_width equal to a*width, specifies, in luma pixel units, the horizontal dimension of the samples of this track on the composition picture. The value of track_width shall be in the range of 1 to composition_width−1, inclusive.

track_height equal to d*height, specifies, in luma pixel units, the vertical dimension of the samples of this track on the composition picture. The value of track_height shall be in the range of 1 to composition_height−1, inclusive.

composition_width specifies, in luma pixel units, the horizontal dimension of the composition picture. The value of composition_width shall be the same in all instances of SubPictureCompositionBox with the same value of track_group_id.

composition_height specifies, in luma pixel units, the vertical dimension of the composition picture. The value of composition_height shall be the same in all instances of SubPictureCompositionBox with the same value of track_group_id.

The rectangle represented by track_x, track_y, track_width, and track_height is referred to as the sub-picture rectangle of this track.

For all tracks belonging to the same sub-picture composition track group and belonging to the same alternate group (i.e., having the same non-zero alternate_group value), the position and size of the sub-picture rectangles shall be respectively identical.

The composition picture of a sub-picture composition track group is derived as follows:
1) Out of all tracks belonging to the sub-picture composition track group, pick one track from each alternate group.
2) For each of the picked tracks, the following applies:
   a. For each value of i in the range of 0 to track_width−1, inclusive, and for each value of j in the range of 0 to track_height−1, inclusive, the luma pixel of the composition picture at luma pixel position
      ((i+track_x) % composition_width, (j+track_y) % composition_height) is set equal to the luma pixel of the sub-picture of this track at luma pixel position (i, j).
   b. When the decoded picture has a chroma format other than 4:0:0, the chroma components are derived accordingly.

The sub-picture rectangles of all tracks belonging to the same sub-picture composition track group and belonging to different alternate groups (i.e., having alternate_group equal to 0 or different alternate_group values) shall not overlap and shall not have gaps, such that in the above derivation process for the composition picture each luma pixel position (p', q'), where p' is in the range of 0 to composition_width−1, inclusive, and q' is in the range of 0 to composition_height−1, inclusive, is traversed exactly once.

Comparing the proposed syntax and semantics with the current DIS, the proposed method has the following pros over the current DIS text:

1) No other new definitions than the composition picture dimensions.
2) Using the existing matrix already designed for this spatial location purpose, which is more general than the one in the Study of DIS.
3) Clearly associate the sub-picture rectangle description with the track dimension in the track header box.
4) No extra signaling for the same purpose that may cause redundancy and potential inconsistency
5) Using the matrix can covers various transformations including translation, rotation, and scaling, especially for the sub-pictures with different track dimensions in the composition.
6) When the sub-picture representing region(s) or face(s) of projected pictures, using the matrix can combine the region/face wise packing processing.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
   interface circuitry configured to receive media data that includes multiple visual tracks of visual data corresponding to respective region views and a piece of configuration information for visual track composition from a subset of the visual tracks; and
   processing circuitry configured to:
      extract, from the media data, the piece of configuration information for the visual track composition, the piece of configuration information specifying a condition indicating whether the piece of configuration information includes a particular piece of composition information for a particular compositing process, the particular compositing process being a spatial compositing process, an alpha compositing process, or a background compositing process;
      generate a sub-picture from the subset of the visual tracks according to the particular piece of composition information for the particular compositing process when the condition indicates that the piece of configuration information for the visual track composition includes the particular piece of composition information for the particular compositing process; and
      generate the sub-picture from the subset of the visual tracks according to a piece of default composition information for the particular compositing process or without performing the particular compositing process when the condition indicates that the piece of configuration information does not include the particular piece of composition information for the particular compositing process.

2. The apparatus of claim 1, wherein the processing circuitry is configured to extract, from a transform property box in the media data, the piece of configuration information for the visual track composition.

3. The apparatus of claim 1, wherein the processing circuitry is configured to extract, from a sub-picture composition box in the media data, the piece of configuration information for the visual track composition.

4. The apparatus of claim 1, wherein the processing circuitry is configured to parse the piece of configuration information to extract a first flag, a second flag, and a third flag for specifying the condition,
   the first flag indicating whether the piece of configuration information includes a first piece of composition information for the spatial compositing process,
   the second flag indicating whether the piece of configuration information includes a second piece of composition information for the alpha compositing process, and
   the third flag indicating whether the piece of configuration information includes a third piece of composition information for the background compositing process.

5. The apparatus of claim 4, wherein the processing circuitry is configured to parse the piece of configuration information to extract the second piece of composition information that indicates an alpha compositing mode and parameters associated with the alpha compositing mode when the second flag indicates that the piece of configuration information includes the second piece of composition information.

6. The apparatus of claim 4, wherein the processing circuitry is configured to parse the piece of configuration information to extract the first piece of composition information that indicates a matrix for the spatial compositing process when the first flag indicates that the piece of configuration information includes the first piece of composition information.

7. The apparatus of claim 6, wherein the processing circuitry is configured to extract the matrix from at least one of a movie header box, a track header box, and a sub-picture composition box in the media data.

8. The apparatus of claim 4, wherein the processing circuitry is configured to parse the piece of configuration information to extract the third piece of composition information that indicates parameters for the background compositing process when the third flag indicates that the piece of configuration information includes the third piece of composition information.

9. An apparatus, comprising:
   processing circuitry configured to:
      form multiple visual tracks of visual data corresponding to respective region views;
      determine whether to include a particular piece of composition information for a particular compositing process in a piece of configuration information for visual track composition from a subset of the visual tracks, the particular compositing process being a spatial compositing process, an alpha compositing process, or a background compositing process;
      include the particular piece of composition information in the piece of configuration information when the particular piece of composition information is determined to be included in the piece of configuration information;
      include indication information in the piece of configuration information that specifies a condition indicating whether the piece of configuration information includes the particular piece of composition information for the particular compositing process; and
      encapsulate the piece of configuration information with the visual tracks in a file; and
   memory circuitry configured to store the file.

10. The apparatus of claim 9, wherein the processing circuitry is configured to encapsulate the piece of configuration information in a transform property box in the file.

11. The apparatus of claim 9, wherein the processing circuitry is configured to encapsulate the piece of configuration information in a sub-picture composition box in the file.

12. The apparatus of claim 9, wherein the processing circuitry is configured to include the indication information that includes a first flag, a second flag, and a third flag for specifying the condition,
the first flag indicating whether the piece of configuration information includes a first piece of composition information for the spatial compositing process,
the second flag indicating whether the piece of configuration information includes a second piece of composition information for the alpha compositing process, and
the third flag indicating whether the piece of configuration information includes a third piece of composition information for the background compositing process.

13. The apparatus of claim 12, wherein the processing circuitry is configured to include the second piece of composition information that indicates an alpha compositing mode and parameters associated with the alpha compositing mode in the piece of configuration information together with the second flag indicating that the piece of configuration information includes the second piece of composition information.

14. The apparatus of claim 12, wherein the processing circuitry is configured to include the first piece of composition information that includes a matrix for the spatial compositing process in the piece of confirmation information together with the first flag indicating that the piece of configuration information includes the first piece of composition information.

15. The apparatus of claim 14, wherein the processing circuitry is configured to encapsulate the matrix in at least one of a movie header box, a track header box, and a sub-picture composition box in the file.

16. The apparatus of claim 12, wherein the processing circuitry is configured to include the third piece of composition information that indicates parameters for the background compositing process together with the third flag indicating that the piece of configuration information includes the third piece of composition information.

17. A method, comprising:
receiving, by interface circuitry of an apparatus, media data that includes multiple visual tracks of visual data corresponding to respective region views and a piece of configuration information for visual track composition from a subset of the visual tracks;
extracting, by processing circuitry of the apparatus from the media data, the piece of configuration information for the visual track composition, the piece of configuration information specifying a condition indicating whether the piece of configuration information includes a particular piece of composition information for a particular compositing process, the particular compositing process being a spatial compositing process, an alpha compositing process, or a background compositing process;
generating a sub-picture from the subset of the visual tracks according to the particular piece of composition information for the particular compositing process when the condition indicates that the piece of configuration information for the visual track composition includes the particular piece of composition information for the particular compositing process; and
generating the sub-picture from the subset of the visual tracks according to a piece of default composition information for the particular compositing process or without performing the particular compositing process when the condition indicates that the piece of configuration information does not include the particular piece of composition information for the particular compositing process.

18. The method of claim 17, wherein the extracting the piece of configuration information for the visual track composition further comprises:
extracting, from at least one of a transform property box and a sub-picture composition box in the media data, the piece of configuration information for the visual track composition.

19. The method of claim 17, further comprising:
parsing the piece of configuration information to extract a first flag, a second flag, and a third flag for specifying the condition,
the first flag indicating whether the piece of configuration information includes a first piece of composition information for the spatial compositing process,
the second flag indicating whether the piece of configuration information includes a second piece of composition information for the alpha compositing process, and
the third flag indicating whether the piece of configuration information includes a third piece of composition information for the background compositing process.

20. The method of claim 19, further comprising:
extracting the second piece of composition information that indicates an alpha compositing mode and parameters associated with the alpha compositing mode from the piece of configuration information when the second flag indicates that the piece of configuration information includes the second piece of composition information.

* * * * *